United States Patent
Curtis

(10) Patent No.: US 8,370,759 B2
(45) Date of Patent: Feb. 5, 2013

(54) VISUALIZING, CREATING AND EDITING BLENDING MODES METHODS AND SYSTEMS

(75) Inventor: Donald B. Curtis, Highland, UT (US)

(73) Assignee: Ancestry.com Operations Inc, Provo, UT (US)

( * ) Notice: Subject to any disclaimer, the term of this patent is extended or adjusted under 35 U.S.C. 154(b) by 905 days.

(21) Appl. No.: 12/240,566

(22) Filed: Sep. 29, 2008

(65) Prior Publication Data

US 2010/0083156 A1    Apr. 1, 2010

(51) Int. Cl.
*G06F 3/048* (2006.01)
*G09G 5/02* (2006.01)

(52) U.S. Cl. ........................ 715/764; 345/594

(58) Field of Classification Search ............ 715/771, 715/833, 764; 382/274, 284; 345/594
See application file for complete search history.

(56) References Cited

U.S. PATENT DOCUMENTS

| | | | | |
|---|---|---|---|---|
| 6,269,196 B1 * | 7/2001 | Hamburg | | 382/284 |
| 6,421,460 B1 * | 7/2002 | Hamburg | | 382/162 |
| 6,856,705 B2 * | 2/2005 | Perez et al. | | 382/264 |
| 8,073,285 B2 * | 12/2011 | Curtis | | 382/274 |
| 2003/0012437 A1 * | 1/2003 | Zaklika et al. | | 382/169 |
| 2009/0052802 A1 | 2/2009 | Curtis | | |
| 2009/0060378 A1 | 3/2009 | Curtis | | |
| 2009/0297022 A1 * | 12/2009 | Pettigrew et al. | | 382/162 |

OTHER PUBLICATIONS

Michael J. Hammel, The Artist's Guide to GIMP Effects, Aug. 17, 2007, Chapter 1 Section 1.6 Patterns and Gradients.*

* cited by examiner

*Primary Examiner* — Kieu Vu
*Assistant Examiner* — James T Durkin
(74) *Attorney, Agent, or Firm* — Kilpatrick Townsend & Stockton LLP

(57) ABSTRACT

A method of creating a blending mode for blending base colors and blend colors to produce resultant colors for one or more pixels of a digital image includes displaying by a display device a relationship between a first independent variable representing the base colors and a dependent variable representing the resultant colors for a specific value of a second independent variable representing blend colors. The method also includes receiving user input altering the relationship, displaying the altered relationship, and storing the relationship as a blending mode.

19 Claims, 6 Drawing Sheets

VISUALIZING, CREATING AND EDITING BLENDING MODES METHODS AND SYSTEMS

CROSS-REFERENCES TO RELATED APPLICATIONS

This patent application is related to the following co-pending, commonly assigned U.S. patent applications: Ser. No. 11/844,443, entitled, "USER INTERFACE METHOD FOR SKEW CORRECTION," filed on Aug. 24, 2007; and U.S. Ser. No. 11/845,635, entitled "USER INTERFACE METHODS AND SYSTEMS FOR IMAGE BRIGHTNESS AND CONTRAST," filed Aug. 27, 2007, the entire disclosure of each of which being incorporated herein for all purposes.

FIELD OF THE INVENTION

Embodiments of the present invention relate generally to image editing systems and methods. More specifically, embodiments of the invention relate to systems and methods for image blending, including useful interfaces for accomplishing image blending and defining imaging blending modes.

BACKGROUND OF THE INVENTION

Presently-available image editing software programs provide the ability to "draw" on a digital image. Drawing may be performed with a digital pen or brush or some other mechanism that changes the colors in the image. Commonly, this involves "blending" a preexisting image property (e.g., color, luminosity, etc.) with data represented by the image editing tool being used. Similarly, a foreground image may be blended with a background image. The blending process may employ "blending modes." Blending modes specify how to combine new image data, either from a tool or a foreground image, with the image data already present in the image.

A common blending mode is the "Normal" blending mode, which simply replaces the current image data with the new image data. Other pre-defined blending modes include: "Color Burn," "Color Dodge," "Darken," "Difference," "Dissolve," "Exclusion," "Hard Light," "Hard Mix," "Lighten," "Linear Burn," "Linear Dodge," "Multiply," "Overlay," "Pin Light," "Screen," "Soft Light," and "Vivid Light." Names given to pre-defined blending modes often attempt to describe the process used to do the blend, the way the blending mode might be most commonly used, and/or an expected result of the blend.

Whatever the name, a blending mode is a specific transformation that takes two inputs (the base color (the original color in the image), sometimes called the background; and the blend color (the color used by the image editing tool or contained in a foreground image) sometimes called the foreground, and from them produces a resulting color that replaces the color in the image. Other properties such as opacity also may be used in conjunction with the blending mode to determine the resulting color. The blending mode transformation could be constructed from a continuous function or in some other way. The blending mode defines what the output will be for each potential combination of inputs.

Written descriptions have been used to communicate to a user the effect of a blending mode and to describe what it does and how it might be used. Pictorial examples may be used to attempt to demonstrate the effect of the blending mode. Such descriptions and pictures can give the user a basic idea of what the blending mode does, but they are imprecise, incomplete, and do not fully convey the transformation associated with the blending mode. Better methods are needed to fully convey the blending mode transformation to the user.

Moreover, the limited set of predefined blending modes is inadequate to produce the type of blending that a user may require. Although additional pre-defined blending modes could address this problem, no set of predefined blending modes will ever address every need. Therefore, methods are needed to enable a user to create custom blending modes.

BRIEF SUMMARY OF THE INVENTION

Embodiments of the invention provide a method of creating a blending mode for blending base colors and blend colors to produce resultant colors for one or more pixels of a digital image. The method includes displaying by a display device a relationship between a first independent variable representing the base colors and a dependent variable representing the resultant colors for a specific value of a second independent variable representing blend colors. The method also includes receiving user input altering the relationship, displaying the altered relationship, and storing the relationship as a blending mode. In some embodiments, the method includes receiving user input selecting one or more additional specific values of the second independent variable. For each selection, user input may be received altering the relationship. For each selection, the altered relationship may be displayed. The method also may include storing the relationship as part of the blending mode. The method may include interpolating a third relationship for a third specific value of the second independent variable. The third relationship may be based on an altered relationship. The method may include replicating a third relationship for a third specific value of the second independent variable. The third relationship may be based on an altered relationship. The method also may include receiving user input selecting a pixel of the digital image. The selected pixel may have a specific base color value. The method also may include receiving user input selecting the specific value of the second independent variable as a blend color to be applied to the pixel and setting a resultant color for the pixel in accordance with the specific base color value, the specific value of the second independent variable, and the relationship. The method also may include receiving user input selecting a background image, receiving user input selecting a foreground image, and applying the blending mode to one or more pixels.

Other embodiments provide a blending mode graphical user interface. The GUI includes means for displaying a relationship between a first independent variable and a dependent variable for a specific value of a second independent variable, and means for receiving user input to select different specific values of the second dependent variable to thereby display different relationships between the first independent variable and the dependent variable for the different specific values of the second dependent variable. The graphical user interface is displayable by an output device. In some embodiments, the means for displaying the relationship includes a first axis for representing the first independent variable and a second axis for representing the dependent variable. The relationship may be represented as at least one line segment. The at least one line segment may include means for receiving user input to thereby change the relationship between the first independent variable and the dependent variable for a specific value of the second independent variable. The first independent variable may represent base colors, the second independent variable, blend colors, and the dependent variable, resultant colors. The means for displaying the relationship may include a rectangle having the first independent variable along a first side and the dependent variable along an adjacent side. The means for receiving user input to select different specific values of the second dependent variable may include one or more of a slide, dial, dropdown menu, pick list, and/or data field.

Still other embodiments provide a blending mode graphical user interface that includes a first object that depicts a relationship between a first independent variable and a dependent variable for a specific value of a second independent variable and a second object that depicts a user input to select different specific values of the second dependent variable to thereby display different relationships between the first independent variable and the dependent variable for the different specific values of the second dependent variable. The graphical user interface is displayable by an output device. In some embodiments, the first object that depicts the relationship comprises a first axis that represents the first independent variable and a second axis that represents the dependent variable. The relationship may be represented as at least one line segment. The at least one line segment may be configured to receive user input to thereby change the relationship between the first independent variable and the dependent variable for a specific value of the second independent variable. The first independent variable may represent base colors, the second independent variable, blend colors, and the dependent variable, resultant colors. The first object may be a rectangle having the first independent variable along a first side and the dependent variable along an adjacent side. The second object may be a slide, dial, dropdown menu, pick list, and data field.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
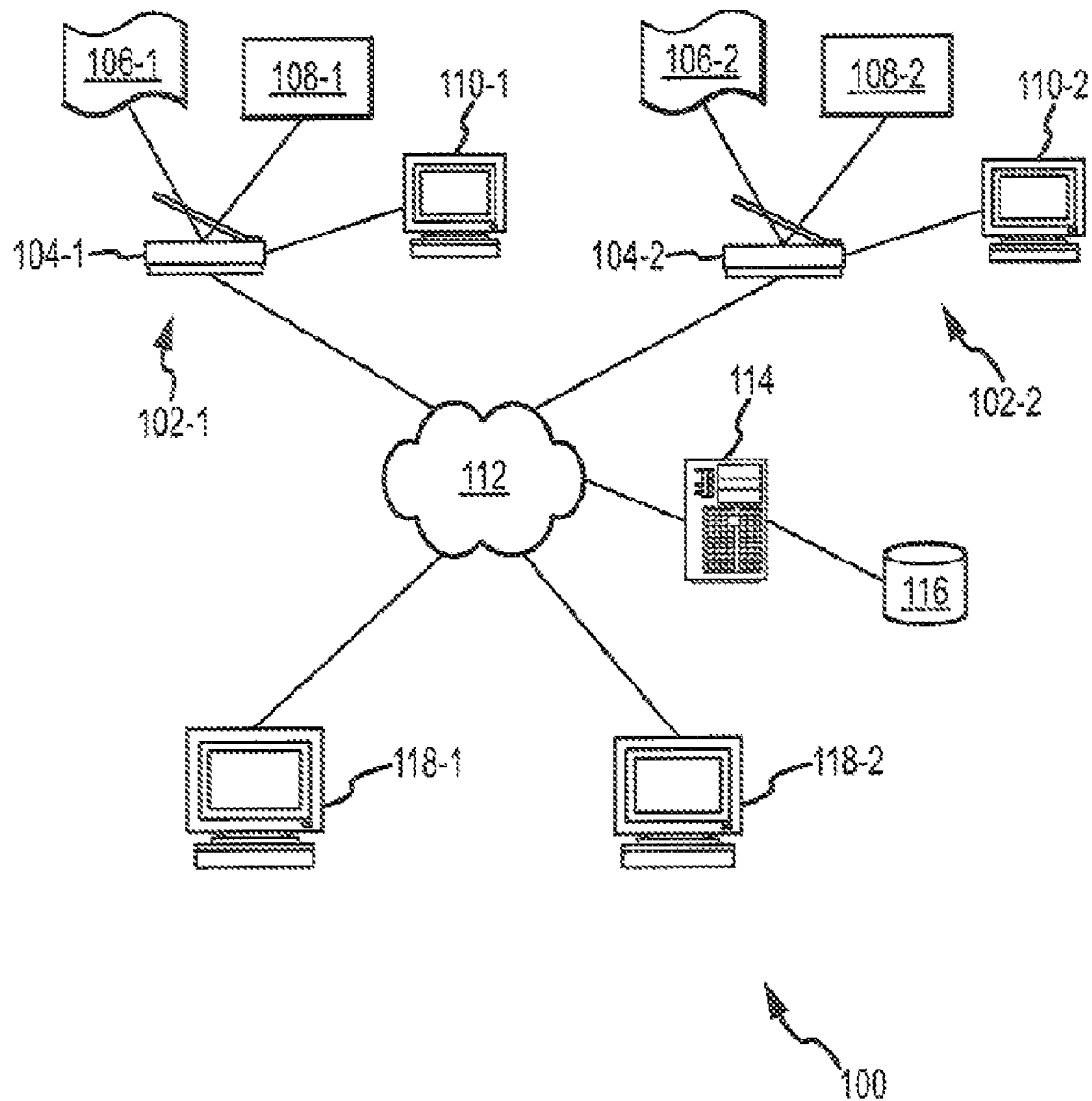
FIG. 1 depicts an exemplary system in which embodiments of the invention may be implemented.

Embodiments of the present invention relate to image editing systems, methods, and user interfaces. In order to provide a context for describing embodiments of the present invention, embodiments of the invention will be described herein with reference to editing images of documents, which may include books, public records, paper documents, microfilm or microfiche documents, and/or the like. Those skilled in the art will appreciate, however, that other embodiments are possible.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention relate to viewing, creating, and editing blending modes in image editing systems. FIG. 1 depicts an exemplary production scanning and image editing system 100 within which embodiments of the invention may be implemented. Those skilled in the art will appreciate that the system 100 is merely exemplary of a number of possible embodiments. The system 100 includes scanning processes 102 that include scanners 104. The scanning processes may be configured to scan images from microfilm or microfiche 106, paper documents 108, books, public records, historical documents, and/or the like. The scanning processes also include an operator workstation 110, which may be integral with the scanner 104.

Image files comprising scanned images may be sent via a network 112 to a server 114 and stored in a database 116 for further processing or use. The images are thereafter available for post-production processing, which may take place at, for example, post-scanning workstations 118.

A post-production image editing technician may use a workstation, such as the workstation 118-1, to perform image editing using blending modes. Among other things, embodiments of the present invention enable users to better understand the transformation that any given blending mode performs and/or create and edit custom blending modes. This is accomplished using a graphical user interface that depicts the relationship among the variables in the blending mode transformation.

There are three primary variables in the blending transformation: the base color, the blend color, and the resulting color. (note that other blending modes may have additional variables or operate on different variables than these three. Also note that while blending modes can treat each channel of a color specification (such as R, G, and B) independently and with the same transformation, embodiments of the present invention described herein will focus on a single color transformation. Those skilled in the art will readily appreciate that the principles of the present invention described herein can easily be extended to independent operations (i.e., different transformations) on multiple color channels.) One approach to graphically displaying a blending transformation is to construct a 3-dimensional representation that depicts the relationship of the three variables. Such a representation may be produced on a continuous surface. Another approach, however, uses a 2-dimensional representation to display the blending transformation (for a single color channel). Assuming 8-bit color, the 2-D representation can be conceptualized as 256 parallel "slices," each depicting a 2-D representation of two of the three transformation variables. That is, each 2-D representation depicts a transformation between all possible base colors and all possible resulting colors for a single blend color. Such a 2-D representation is depicted at FIGS. 2A and 2B.

Figure 2A:
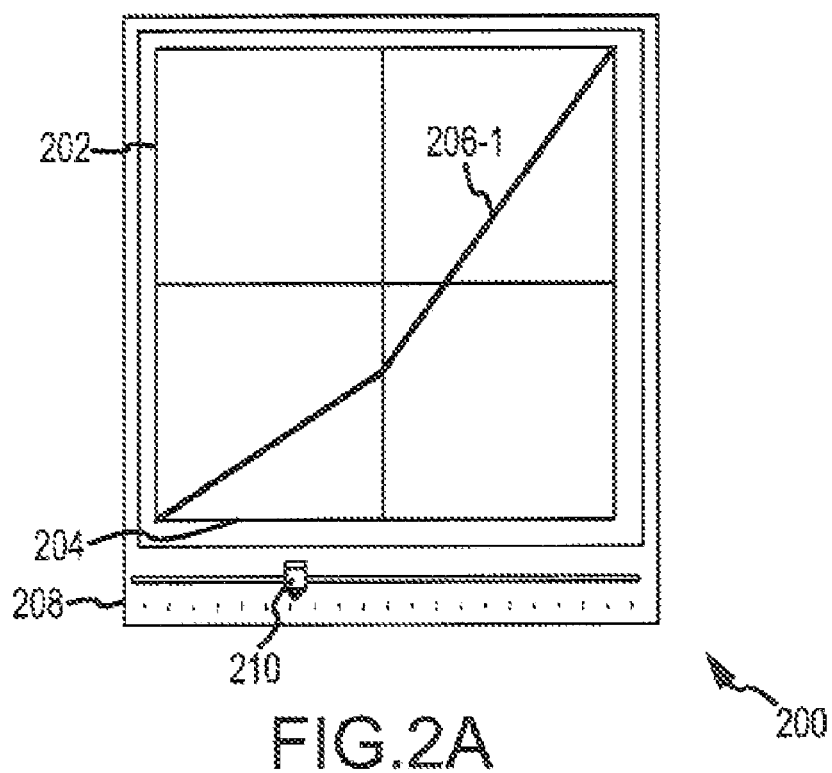
FIGS. 2A, 2B, 3A, 3B, 4A, 4B, 5A, and 5B depict various exemplary embodiments of a blending modes graphical user interface according to embodiments of the invention.
Figure 2B:
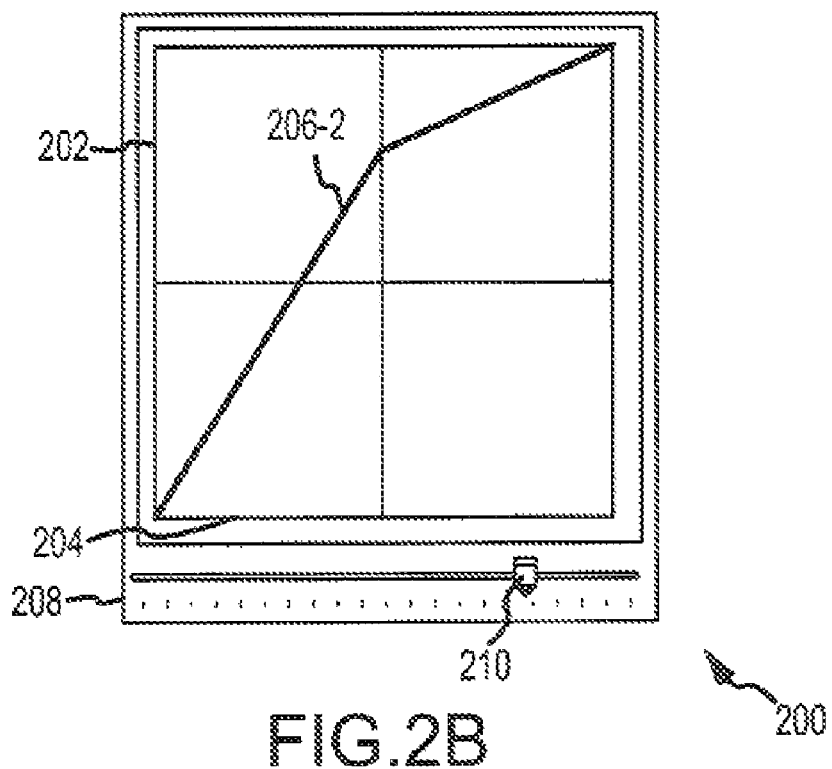

FIGS. 2A and 2B depict first and second views, respectively, of a blending modes graphical user interface (GUI) 200 according to embodiments of the invention. In this particular example, the GUI depicts the Overlay Blending Mode for two different blend colors. The GUI 200 includes a vertical axis 202 and a horizontal axis 204. In this exemplary embodiment, the horizontal and vertical axes are perpendicular to one another, although this is not a requirement. In this example, the horizontal axis 204 represents all possible base colors; the vertical 202 axis represents all possible resulting colors. The horizontal axis 204 represents an independent variable; the vertical axis 202 represents a dependent variable. The line 206 represents the relationship between the base color and the resulting color for all possible values of each. The line 206 may be a single line segment or may be made up of several line segments.

As mentioned above, each view of the GUI 200 represents the relationship between the base color and the resulting color for a single blend color. The specific blend color depicted by a particular view is determined by a blend color slide indicator 208 and the position of a slide 210 on the indicator. The slide 210, therefore acts as a second independent variable. Hence, in this example, the relationship 206-1 represents the transformation for a first blend color, and the transformation 206-2 represents the relationship for a second blend color 206-2. A user may use the slide 210 to reveal the transformation for any possible blend color.

Although in this exemplary embodiment, the base color is depicted on the horizontal axis, the resulting color is depicted on the vertical axis, and the blend color is determined by the slide control 208, this is not a requirement. The variables may be interchangeable and user determinable.

The relationship 206 may itself serve as a user input that allows a user to select the transformation for any given blend color (or other variable if used as the second independent variable). For 8-bit color, the user may set the relationship between base color and resulting color 256 times, once for each possible blending color. Because this could be an overwhelming task, however, some embodiments provide interpolation between specific blend colors set by the user. The user may elect to "lock" specific base color choices to thereby prevent them from being altered by changes to other blend color transformation settings. Or the GUI 200 may be programmed to provide user setting of only a limited number of blending colors. Many examples are possible. Moreover, different interpolation functions may be applied. For example, specific blend colors may serve as an anchor point, and the interpolated transformation for nearby blend colors may be affected by movements of the transformation on either side of the blend color acting as an anchor point. Many examples are possible.

Although the relationships 206-1 and 206-2 in FIGS. 2A and 2B depict transformations having discontinuities, this need not be the case. The views 300 and 302 of FIGS. 3A and 3B respectively, depict curved transformations 306-1 and 306-2. In these transformations, the base colors are transformed smoothly and continuously as represented by the curves for two different blend colors. Embodiments of the invention may use curve sets, such as Bezier curves as the basis for a virtually unlimited number of user-defined or pre-defined blending modes.

In addition to the variables identified and discussed above—base color, blend color, and resulting color—many other variables may be introduced and user definable to result in tremendous flexibility for user. These include:

Starting base color threshold. This value defines where the blending operation begins to have an affect on the image. Base colors less than this value remain unchanged.

Ending base color threshold. This value describes the number of colors at the end of scale that are to remain unchanged. For example, in an 8 bpp example with a threshold of 10, base colors greater than 255–10 (245) remain unchanged.

Description of the remaining portion of the transformation function. This could be, for example, a set of one or more portions of the transformation curve for one or more of the blend colors. The description would be constrained such that exactly one result value would be present for each base color. The description might include:

A starting and ending point of the base colors that are affected.

What the result value should be at the start base color point.

What the result value should be at the end base color point.

How the values in between the start and end point should be generated:

As a linear interpolation between the two points, OR

As a curve between the two points. If a curve:
- The type of curve (e.g. Bezier)
- The magnitude of the curve and its direction (positive or negative)
- Whether the curve has an influence beyond the start and/or end points.

Mid-tone blending color threshold. This value describes the number of mid-tone values on each side of the center value of the blending colors that will not cause a change in the image. For example, if the threshold is 2, then none of the blending colors 126, 127, 128, and 129 (the four center values in 8 bpp) will affect the resulting image colors, i.e. the base colors will remain unchanged.

Figure 4A:
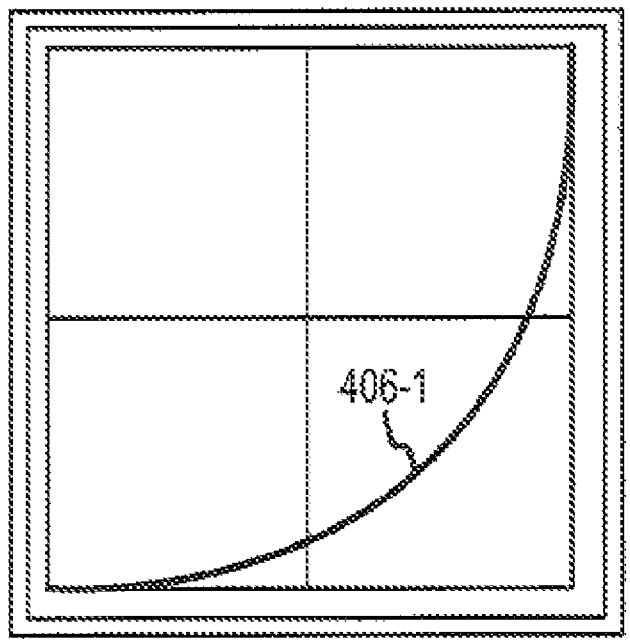
Figure 4B:
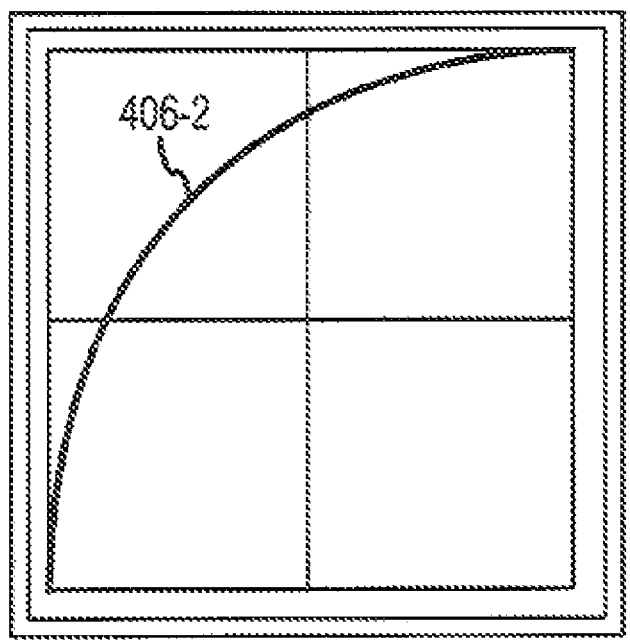

Interpolation between transformation functions across blending colors. As mentioned above, the blending transformation for first and second blending colors may be set, and all the transformations for blending colors in between the two could be automatically calculated by interpolation (e.g., by linear interpolation). This greatly simplifies the definition of the set of blending transformations. To with, rather than defining 256 transformations, one for each blending color, only two (or some other number smaller than 256) may be defined and the remaining ones defined by interpolation and/or replication. FIGS. 4A and 4B depict, respectively, curves 406-1 and 406-2 for a blending color of 0 and a blending color of 255. The transformations for the blending colors in between are generated by interpolating the magnitude of the two curves.

Figure 5A:
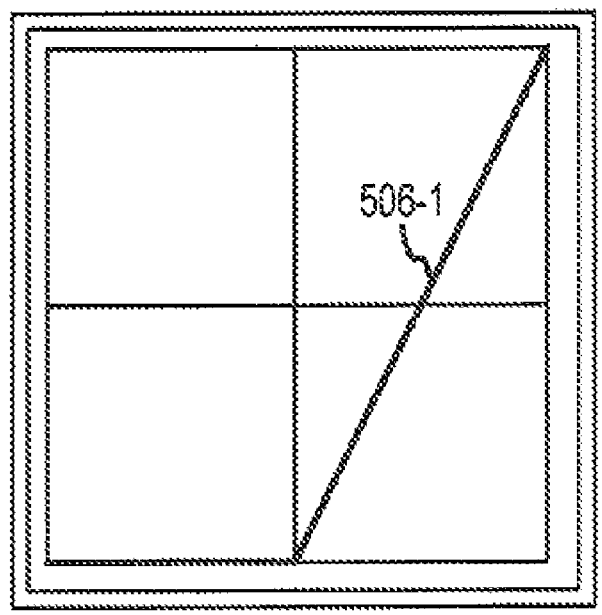
Figure 5B:
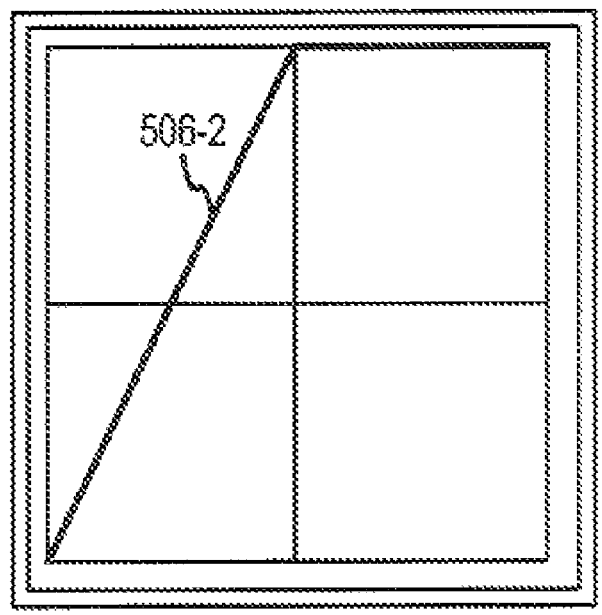

FIGS. 5A and 5B depict a similar interpolation example. In this example, the relationship 506-1 of FIG. 5A defines the blending transformation for blending color 0 and the relationship 506-2 of FIG. 5B defines the blending transformation for blending color 255. All the blending transformations for blending colors in between 0 and 255 are defined as linear interpolations of the common point of the two lines, between the starting and ending point of that shared point.

Figure 6:
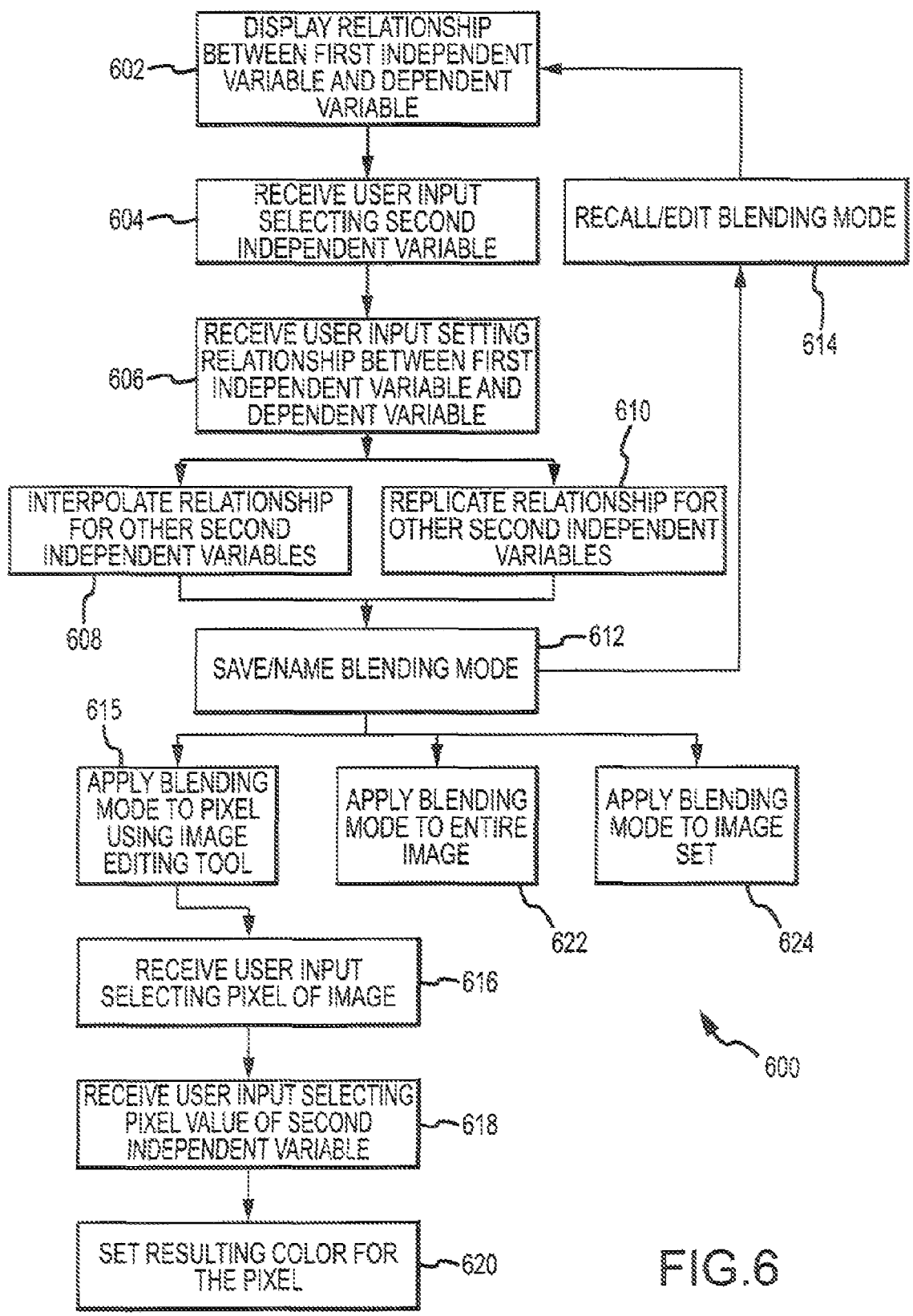
FIG. 6 depicts an exemplary method of creating, editing, and using blending modes according to embodiments of the invention, which may be implemented in the system of FIG. 1.

Having described an exemplary system 100 and various exemplary embodiments of a graphical user interface (FIGS. 2A, 2B, 3A, 3B, 4A, 4B, 5A, and 5B), attention is directed to FIG. 6, which depicts an exemplary method 600 according to embodiments of the invention. The method 600 may be implemented in the system of FIG. 1. For example, the method may be embodied in software (computer-readable/executable instructions) that programs a workstation 118. Those skilled in the art will appreciate that the method 600 is merely exemplary of a number of possible embodiments. Other embodiments may include more, fewer, or different steps than those illustrated and described herein.

The method 600 begins at block 602, at which a relationship between a first independent variable (e.g., base color) and a dependent variable (e.g., resulting color) is displayed. At block 604, a user input is received that specifies a value for a second independent variable (e.g., blend color). These three steps result in one of the exemplary GUIs of FIGS. 2-5.

Figure 3A:
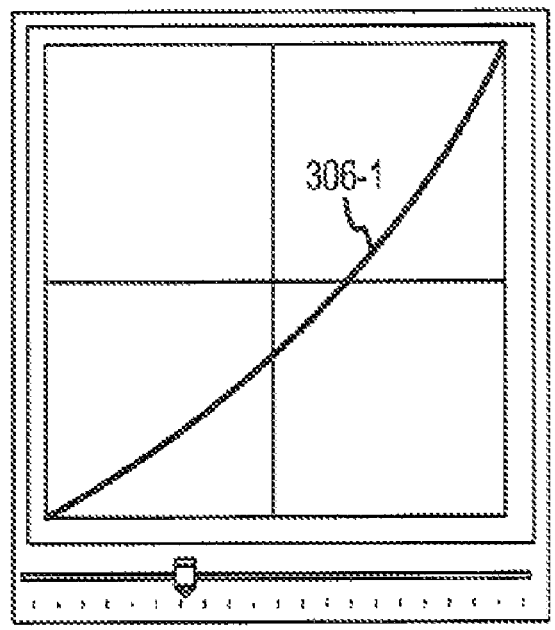
Figure 3B:
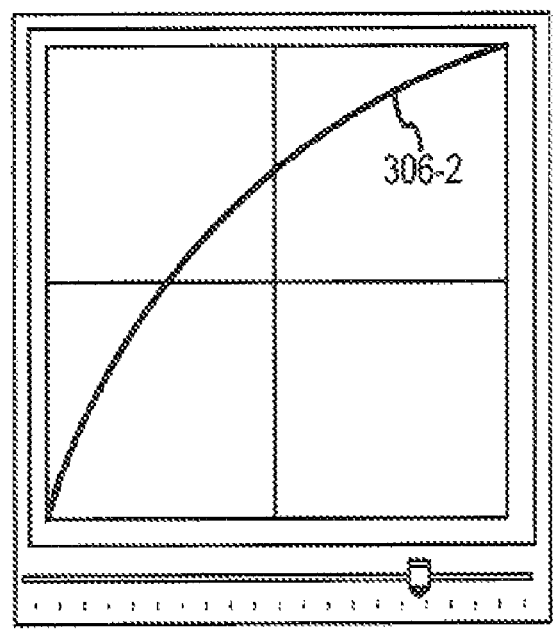

At block 606, a user input is received that alters the relationship between the base color and the resulting color for the specified blend color. The result may resemble any of the relationships depicted in FIGS. 2-5 or any of a variety of other relationships. For example, the relationship may be linear over the entire range. Or the relationship may include several line segments having different slopes, as depicted in FIGS. 2A and 2B. The relationship may be represented by a curve, as depicted in FIGS. 3A and 3B. If curved, the relationship may have any curvature. Further, the relationship may be represented by multiple curve segments. Further still, the relationship may be represented by any combination of the foregoing.

At block 608, a relationship for other blend color values is determined by interpolation. For example, if the relationship is set at block 606 for a non-endpoint blend color, then for each blend color between this non-endpoint blend color and each endpoint blend color, the relationship may be interpolated based on the relationship set by the user at the non-endpoint blend color and a pre-existing relationship at each endpoint.

Alternatively, at block 610, the relationship defined at block 606 may be replicated for other blend colors. The resulting blending mode may be saved and named at block 612.

It should be appreciated that, by recalling the saved blending mode at block 614, the blending mode may be endlessly edited and resaved. This may include setting the relationship for other blend color values and either interpolating or replicating between values at the user's option.

At block 615, the blending mode may be applied to individual pixels of an image using, for example, an image editing tool. This is accomplished by the user selecting a pixel of the image at block 616 and a blend color at block 618. The resulting color is set for the pixel at block 620 using the relationship for the selected blend color and the pixel value as the base color.

At block 622, the blending mode is applied to an image. In such an example, a foreground image is blended into a background image by taking the pixel value at each pixel of the background image as the base color, the pixel value at each corresponding pixel of the foreground image as the blend color, and using the relationship for each blend color to determine the resulting color for the pixel. In a similar manner, at block 624, the blending mode may be applied to an entire image set. Many other examples are possible.

Having described several embodiments, it will be recognized by those of skill in the art that various modifications, alternative constructions, and equivalents may be used without departing from the spirit and scope of the invention. For example, embodiments of the present invention have been described with respect to a single color channel. In other embodiments, the principles may be applied to multiple color channels and or different variables (e.g., hue, intensity, etc.). Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of creating a blending mode for blending base colors and blend colors to produce resultant colors for one or more pixels of a digital image, the method comprising:

displaying by a display device a relationship between a first independent variable representing a first set of colors that are the base colors, and a dependent variable representing the resultant colors for a specific color of a second independent variable representing a second set of colors that are blend colors separate from the first set of colors, wherein the relationship displayed comprises at least one line depicting the resultant color produced for each color of the first set of colors that are base colors represented by the first independent variable after the specific color of the blend colors has been blended with each base color, and wherein each of the first and second sets of colors comprises a plurality of colors;

receiving user input altering the relationship;
displaying the altered relationship; and
storing the relationship as a blending mode.

2. The method of creating a blending mode for blending base colors and blend colors to produce resultant colors for one or more pixels of a digital image of claim 1, further comprising:
receiving user input selecting one or more additional specific values of the second independent variable;
for each selection, receiving user input altering the relationship;
for each selection, displaying the altered relationship; and
storing the relationship as part of the blending mode.

3. The method of creating a blending mode for blending base colors and blend colors to produce resultant colors for one or more pixels of a digital image of claim 2, further comprising:
interpolating a third relationship for a third specific value of the second independent variable, wherein the third relationship is based on an altered relationship;
displaying the interpolated relationship; and
storing the relationship as part of the blending mode.

4. The method of creating a blending mode for blending base colors and blend colors to produce resultant colors for one or more pixels of a digital image of claim 2, further comprising:
replicating a third relationship for a third specific value of the second independent variable, wherein the third relationship is based on an altered relationship;
displaying the replicated relationship; and
storing the relationship as part of the blending mode.

5. The method of creating a blending mode for blending base colors and blend colors to produce resultant colors for one or more pixels of a digital image of claim 1, further comprising:
receiving user input selecting a pixel of the digital image, wherein the selected pixel has a specific base color value;
receiving user input selecting the specific value of the second independent variable as a blend color to be applied to the pixel; and
setting a resultant color for the pixel in accordance with the specific base color value, the specific value of the second independent variable, and the relationship.

6. The method of creating a blending mode for blending base colors and blend colors to produce resultant colors for one or more pixels of a digital image of claim 1, further comprising:
receiving user input selecting a background image;
receiving user input selecting a foreground image; and
applying the blending mode to one or more pixels.

7. The method of claim 1, wherein the user input altering the relationship comprises selecting a resultant color to be produced for a specific base color, wherein the resultant color to be produced is a resultant color other than the resultant color as originally depicted by the displayed relationship.

8. The method of claim 7, further comprising prior to displaying the altered relationship:
determining a new resultant color for at least one base color other than the specific base color altered, wherein the determination comprises selecting a resultant color for the at least one other base color such that the resultant color is a resultant color occurring between the resultant color as altered for the specific base color and the resultant color as depicted by the relationship for an end-point base color.

9. The method of claim 7, wherein displaying the altered relationship comprises reconfiguring the relationship for base colors between the specific base color and an end-point base color to interpolate resultant colors for each base color occurring between the specific base color and the end-point base color, wherein the end-point base color relationship to its resultant color does not change from the original relationship.

10. A blending mode graphical user interface, comprising:
an output device
means for displaying a relationship via the output device between a first independent variable representing a first set of colors that are the base colors, and a dependent variable representing the resultant colors for a specific color of a second independent variable representing a second set of colors that are blend colors separate from the first set of colors, wherein the relationship displayed comprises at least one line depicting the resultant color produced for each color of the first set of colors that are base colors represented by the first independent variable after the specific color of the blend colors has been blended with each base color, and wherein each of the first and second sets of colors comprises a plurality of colors; and
means for receiving user input to select different specific values of the second dependent variable to thereby display different relationships between the first independent variable and the dependent variable for the different specific values of the second dependent variable.

11. The blending mode graphical user interface of claim 10, wherein the means for displaying the relationship comprises a first axis for representing the first independent variable and a second axis for representing the dependent variable and wherein the relationship is represented as at least one line segment.

12. The blending mode graphical user interface of claim 11, wherein the at least one line segment comprises means for receiving user input to thereby change the relationship between the first independent variable and the dependent variable for a specific value of the second independent variable.

13. The blending mode graphical user interface of claim 10, wherein the means for displaying the relationship comprises a rectangle having the first independent variable along a first side and the dependent variable along an adjacent side.

14. The blending mode graphical user interface of claim 13, wherein the means for receiving user input to select different specific values of the second dependent variable comprises at least one selection from a group consisting of slide, dial, dropdown menu, pick list, and data field.

15. A blending mode graphical user interface, comprising:
an output device
a first object displayed on the output device that depicts a relationship between a first independent variable representing a first set of colors that are the base colors, and a dependent variable representing the resultant colors for a specific color of a second independent variable representing a second set of colors that are blend colors separate from the first set of colors, wherein the relationship displayed comprises at least one line depicting the resultant color produced for each color of the first set of colors that are base colors represented by the first independent variable after the specific color of the blend colors has been blended with each base color, and wherein each of the first and second sets of colors comprises a plurality of colors; and
a second object that depicts a user input to select different specific values of the second dependent variable to thereby display different relationships between the first independent variable and the dependent variable for the different specific values of the second dependent variable,
wherein the graphical user interface is displayed by an output device.

16. The blending mode graphical user interface of claim 15, wherein the first object that depicts the relationship comprises a first axis that represents the first independent variable and a second axis that represents the dependent variable and wherein the relationship is represented as at least one line segment.

17. The blending mode graphical user interface of claim 16, wherein the at least one line segment is configured to receive user input to thereby change the relationship between the first independent variable and the dependent variable for a specific value of the second independent variable.

18. The blending mode graphical user interface of claim 15, wherein the first object comprises a rectangle having the first independent variable along a first side and the dependent variable along an adjacent side.

19. The blending mode graphical user interface of claim 18, wherein the second object comprises at least one selection from a group consisting of slide, dial, dropdown menu, pick list, and data field.

* * * * *